United States Patent [19]

Stengle, Jr.

[11] 3,993,183
[45] Nov. 23, 1976

[54] LEHR LOADING BAR
[75] Inventor: Edward J. Stengle, Jr., Toledo, Ohio
[73] Assignee: Owens-Illinois, Inc., Toledo, Ohio
[22] Filed: Jan. 29, 1976
[21] Appl. No.: 653,333

[52] U.S. Cl. .................................. 198/429; 198/866
[51] Int. Cl.² ................................. B65G 47/08
[58] Field of Search .............. 198/24, 31 R, 31 AA, 198/31 AB, 221–224

[56] References Cited
UNITED STATES PATENTS

| | | | |
|---|---|---|---|
| 1,906,786 | 5/1933 | Bowman et al. | 198/31 AB |
| 2,001,332 | 5/1935 | Ross | 198/31 AA |
| 2,113,929 | 4/1938 | Benoit | 198/31 AB |
| 2,176,241 | 10/1939 | Beck | 198/31 AA |
| 3,040,867 | 6/1962 | Posten et al. | 198/31 AA |
| 3,687,262 | 8/1972 | Campbell et al. | 198/31 AA |
| 3,724,639 | 4/1973 | Hara | 198/31 R |
| 3,853,213 | 12/1974 | Lehman et al. | 198/31 AB |

*Primary Examiner*—Evon C. Blunk
*Assistant Examiner*—Richard K. Thomson
*Attorney, Agent, or Firm*—Steve M. McLary; E. J. Holler

[57] ABSTRACT

An improved lehr loading bar for loading newly formed glass containers into an annealing lehr. A series of relatively flat faced liner bars are loaded into a carrier bar having opposed dove tail slides. The liner bars are separated by spacers which also engage the dove tail slides. The space between adjacent spacers defines a pocket into which a glass container may fit for transfer to a lehr. Both liner bars and spacers are made of carbon or carbon graphite material to prevent thermal damage to the hot glass containers when they touch them.

6 Claims, 5 Drawing Figures

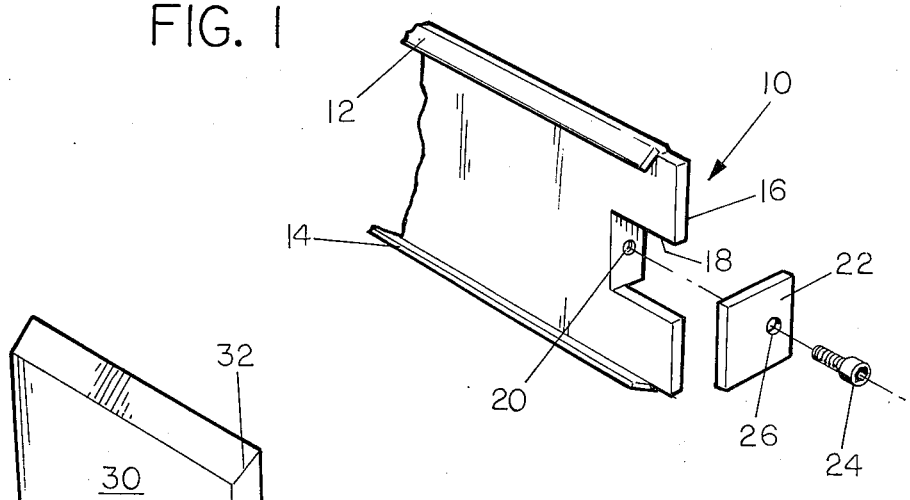
FIG. 1
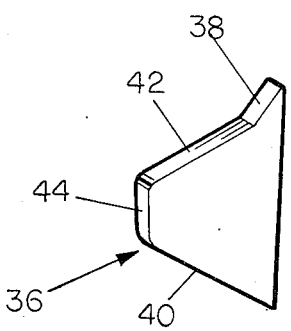
FIG. 2
FIG. 3
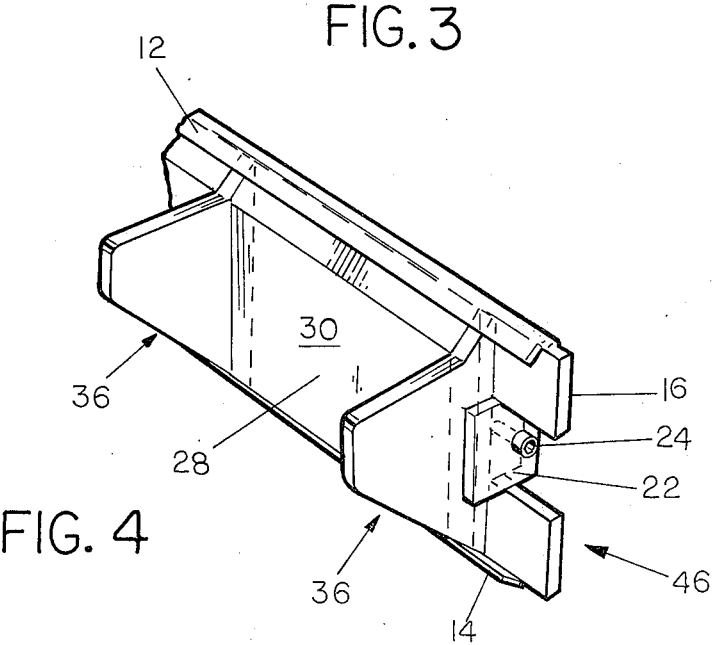
FIG. 4

LEHR LOADING BAR

BACKGROUND OF THE INVENTION

This invention generally relates to annealing lehr loading bars. More particularly, this invention relates to such bars which have a series of pockets to engage glass containers for movement into the lehr. Specifically, this invention relates to such a loading bar wherein the pockets are defined by removable liner bars and spacers made of a carbon based material.

The most general method of loading glass containers into an annealing lehr is to push a single file row of containers off one conveyor onto the lehr transport conveyor. At this stage in their manufacture, glass containers are still hot and subject to thermal shock damage if touched by material, such as steel, having heat sink properties. The bar which is moved to push the containers has therefore been covered, in most cases, by an asbestos based material, transite for example. This is quite adequate for a flat bar. However, bars with pockets to precisely position the containers have proven useful. Such bars may be seen in the following U.S. Pats. Nos.: 3,184,031; 3,687,262; 3,853,213. One problem with such preformed bars is their inflexibility. If the size of the container being made is changed, an entire new bar is required. Because of health requirements, it is becoming more difficult to cut and shape asbestos materials in an ordinary plant environment. Such bars must therefore be made elsewhere at considerable expense. In some cases, flat bars had spacers screwed onto them to define pockets. However, even these bars were difficult to change because of the number of bolts to remove and replace. I have solved these problems by making the glass contact elements of a lehr bar from a carbon based material. This may be cut in the plant without danger. Further, the pockets are defined by liner bars and spacers which fit into dove tail slots and are easily re-arranged for different size containers.

SUMMARY OF THE INVENTION

My invention is an improvement in an apparatus for loading glass containers into an annealing lehr. In this apparatus, a lehr loading mechanism moves a lehr loading bar in a repeating cycle to bring the loading bar into contact with a single file row of the glass containers and push them toward the lehr. My improvement resides in an improved lehr loading bar. The bar includes a main member which is substantially equal in length to the distance defined by the length of the single file row of glass containers to be moved toward the lehr at one time. A first angled flange is attached to one edge of the main member along its length and is inclined toward the centerline of the main member. A second angled flange is attached to the opposite edge of the main member from the first angled flange and is also inclined toward the centerline of the main member on the same side thereof as the first angled flange. A plurality of liner bars are in engagement with the first and second angled flanges. The liner bars all have a front face which extends beyond the angled flanges toward the glass containers. The length of each front face is slightly more than one glass container diameter. A plurality of spacers are also engaged with the first and second angled flanges. The spacers and liner bars are arranged in a repeating alternating pattern. The spacers extend toward the glass containers further than do the liner bars. Thus, pockets for the glass containers are defined between adjacent spacers separated by liner bars. A means is provided for locking the spacers and liner bars into the flanges.

BRIEF DESCRIPTION OF THE DRAWINGS

FIG. 1 is a perspective view of a portion of the carrier bar of the present invention;

FIG. 2 is a perspective view of one of the liner bar members of the present invention;

FIG. 3 is a perspective view of one of the spacer members of the present invention;

FIG. 4 is a perspective view of a portion of an assembled lehr loading bar of the present invention.

DETAILED DESCRIPTION OF THE DRAWINGS

Figure 5:
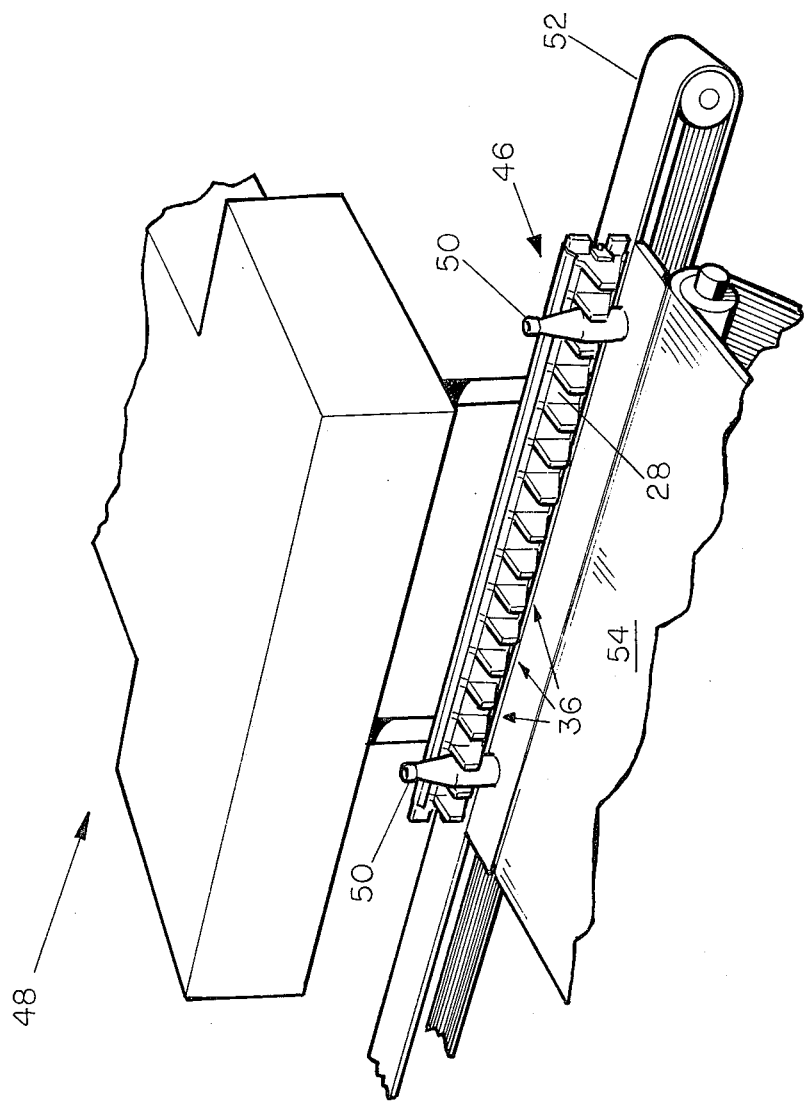
FIG. 5 is a perspective view illustrating the present invention in its operational environment.

FIG. 1 illustrates one end and a linear portion of a carrier bar 10 which makes up a portion of the present invention. As is well known, the carrier bar 10 is of a sufficient length to extend across substantially the entire width of a glass annealing lehr. It is the movement of the carrier bar and any glass contact materials associated with it which push the newly formed glass containers into the annealing lehr. As has been pointed out, one difficulty with such mechanisms in the past has been the problem of adjusting any spacers or sawtooth patterned contact pieces which were assembled to the carrier bars. The carrier bar 10 is of a type which is not completely unknown in the prior art. Two angled flanges 12 and 14 are attached to the upper and lower surfaces of a main member 16 of the carrier bar 10. The main member 16 is basically a section of flat steel which is of the desired length and thickness. The angled flanges 12 and 14 are used to define a dove tailed slot into which the glass contact portions which are a part of the present invention may be inserted. The end of the main member 16 is cut out slightly to define a retaining slot 18 which has a threaded opening 20 formed at its bottom most portion. A retaining plate 22 is inserted into the slot 18 in operation and is held in place with a bolt 24 which extends through an opening 26 completely through the plate 22 and into engagement with the threaded opening 20.

FIG. 2 illustrates one of the two types of glass contact members which are united with the carrier bar 10 to form the complete lehr loading bar which is the subject of the present invention. In FIG. 2, a liner bar 28 is illustrated. The liner bar 28 has a relatively flat front face 30 with angled faces 32 and 34 extending away from the front face 30. The angles defined by the flanges 12 and 14 and the angles defined by the faces 32 and 34 are made to be complimentary so that the liner bar 28 may be slid into engagement with the carrier bar 10 and held snuggly in place with the front face 30 extending beyond the flanges 12 and 14. The liner bar 28 may also be described as a trapezoidal prism, with the angled faces thereof engaged with the flanges 12 and 14. The liner bar 28 is preferably made of a carbon material or a carbon and graphite composite type material. These materials have been found to be particularly adaptable for contact with hot glass containers in that they do not cause surface damage to the glass containers when they touch the hot glass surface. Such materials are relatively unusual, in that many materials have high heat transfer coefficials and when in contact with hot glass containers create surface flaws or checks in the glass containers.

FIG. 3 illustrates a spacer 36 which is another of the members which combine to make the total apparatus of the present invention. The spacer 36 is also a carbon or carbon graphite type material such as that used for the liner bar 28. The spacer 36 is drawn to roughly the same scale in FIG. 3 as is the liner bar in FIG. 2. It may be readily seen therefore that the longitudinal dimension of the spacer 36 is much, much shorter than that of the liner bar 28. Conversely, the height or altitude of the spacer 36 is much greater than that of the liner bar 28. The spacer 36 has at least one angled face 38 designed to co-operate with the angled flange 12 of the carrier bar 10. The lower most portion of the spacer 36 may be a continuous angled face 40 which is set at the angle of the angled flange 14. It should be realized, of course, that the continuous extension of the angled face 40 is not a necessary requirement for this particular face of the spacer 36. However, it has been found that in operation the glass containers which are to be moved into the lehr by the present invention are not always precisely aligned. In some lehr loading mechanisms, the spacer 36 may be coming down onto the glass containers from an elevation above them. If there is some misalignment, the continuous angled face 40 allows the glass container to slide somewhat relative to the spacer 36 rather than being smashed by the spacer 36. However, it is possible that the continuous angled face of the spacer 36 may be replaced by a linear face or a face angled at a different inclination than that shown in FIG. 3. For example, it is readily seen that the angled face 38 meets with a linear face 42 which merges with a front surface 44 which also merges with the continuous angled face 40.

FIG. 4 illustrates the assembly of a carrier bar 10, liner bar 28 and spacer 36 to form a portion of an assembled lehr loading bar 46 which is the subject of the present invention. As has been pointed out, it has been known in the art to provide sawtooth type pockets or other types of pockets for lehr loading bars. However, these designs were all deficient in that they were set precisely for a particular diameter of glass container, and when another size glass container was furnished to this lehr, it was necessary to make a completely new bar or at least replace that portion of that bar which contacted the glass container. It should be clear that with the present invention, all that is required is that the liner bar 28 be tailored in size so that between two adjacent spacers 36, a space is provided which is approximately equivalent to the diameter of the glass container. The center to center dimension between adjacent spacers 36 such as seen in FIG. 4 is preferably kept as small as possible. The spacers 36 are therefore made as thin as possible consistent with strength requirements. In general, the center to center spacing is slightly more than glass container diameter. It is important to realize that the liner bar 28 may be made in standard lengths and then cut to the required length in the glass container factory as required. Since there is no asbestos or asbestos containing materials in these bars, it is possible to perform this function without presenting a health hazard to those who work with such materials. The assembled form shown in FIG. 4, is of course only a portion of a total lehr loading bar 46, since the total length of such a bar would be the length of the opening of the lehr. However, it should be quite clear that the general pattern of the entire length of the bar is clearly illustrated by FIG. 4. The retaining plate 22 is screwed in place and holds the final spacer 36 in location, bearing against all of the other liner bars 28 and spacers 36 in the entire unit. A glass container to be moved into the lehr will be captured between adjacent spacers 36 and will touch the front face 30 of the liner bar 28. As has been noted, due to the thermal properties of the material of which these elements are made, no damage will result to the glass container from this contact. The liner bars 28 and spacers 36 are captured beneath the angled flanges 12 and 14 with these flanges acting in the form of dove tail slots to capture and securely hold these elements in place. FIG. 4 should clearly illustrate that if conditions change requiring a different space between adjacent spacers 36 as a result of the change in the diameter of the glass container, all that is required is the removal of the liner bars 28 and insertion of new liner bars 28 of the proper length to allow accurate diametrical spacing. This procedure is relatively quick and simple since, in contrast to the prior art devices, there is only one or perhaps two screws to loosen in the entire process. The rest of the elements simply slide out from under the angled flanges 12 and 14 and are quickly and cheaply replaced. As has been noted in the prior art, spacers such as 36 have been screwed into place, or a specifically formed sawtooth type configuration of bar had been used, requiring the use and formation of an entirely new bar for each diameter of glass container which is to be operated.

FIG. 5 illustrates the lehr loading bar 46 which is the subject of the present invention generally in its operational environment. The lehr bar 46 is carried by and moved by a lehr loading mechanism 48 which may be that shown in U.S. Pat. No. 3,184,031. The purpose of FIG. 5 is simply to show the entire length of the lehr loading bar 46 and at least one glass container in contact with it to further clarify its overall appearance and function. Glass containers are furnished in a single file on a moving conveyor belt 52. Only two glass containers 50 are shown in FIG. 5, since to have shown the entire lehr loading bar 46 filled with glass containers, as is normally the case, would obscure the lehr loading bar 46. Instead, the two glass containers illustrated are simply exemplary of the manner in which all the glass containers 50 which move along the conveyor belt 52 are engaged by the lehr loading bar 46. The mechanism 48 brings the lehr loading bar 46 down behind the glass container 50 pushing them forward from the conveyor 52 onto a moving lehr mat 54. The lehr mat 54 is a metal type of conveyor belt which carries the glass containers 50 through an annealing lehr, not shown in FIG. 5, for the relief of residual stresses. The actual operating characteristics of the lehr loading mechanism 48 are not critical to the operation of the present invention. Rather, as has been pointed out, the present invention resides in the lehr loading bar 46 itself and the specifically configured components which go into making it. While the lehr loading bar 46 as viewed in FIG. 5 does have some cursory resemblance to the sawtooth type lehr bars of the prior art, the preceding drawing figures have shown that the lehr loading bar 46 is a very precisely configured unit which has overcome the problems presented by the prior art in terms of flexability and ease of changing from one bottle diameter to another.

A material which has been found satisfactory for fabrication liner bars 28 and spacers 36 is that designated as P-5735 and furnished by Pure Carbon Company, St. Mary's, Pennsylvania 15857. This material has a porosity in the range of 10–12% and a thermal conductivity, measured in BTU/F+$^2$-hr-° F and hereinafter in this discussion used as the units for thermal conductivity, of about 5 in the 500° to 1200° F. range which is most important, since the glass containers generally fall within this range of temperatures at the time they are ready to enter the lehr. By way of comparison, a tradition asbestos based material such as transite also has a thermal conductivity, in consistent units, of 5 in the same general temperature range.

It is desirable to keep the thermal conductivity value as low as possible, the ideal being a value of about 1.1 which is exhibited by extremely pure carbon. However, there are always practical considerations of mechanical strength and durability to be considered. The porosity of a carbon based material also has an effect on its mechanical properties. A very pure carbon material designed as P-7620, furnished by Pure Carbon Company, has also proven effective having a thermal conductivity of 1.1 in the 500° to 1200° F. temperature range. The porosity of this material is about 17%. Another suitable material from Pure Carbon Company is designated as P-7344. This material has more graphite inclusions and exhibits a thermal conductivity of 4.5 to 4.7 in the noted temperature range. The porosity of P-7344 is about 20%. A material designated PC-60 and furnished by Union Carbide Company exhibited a thermal conductivity of 1.0 in the 500° F. to 1200° F. temperature range. This was a very porous material, having a porosity of 48% which increased the thermal resistance of the material below the value for its major constituent of carbon. Thus, in general, one would wish the material for the liner bars 28 and spacers 36 to exhibit a thermal conductivity of from about 1 to about 5 in the general temperature range of 500° to 1200° F. In addition, the porosity of the material may vary from 10% to as high as 48%.

What I claim is:

1. In an apparatus for loading glass containers into an annealing lehr wherein a lehr loading mechanism moves a lehr loading bar in a repeating cycle to bring said lehr loading bar into contact with a single file row of said glass containers and push them toward said lehr, an improved lehr loading bar which comprises, in combination:

a main member substantially equal in length to the distance defined by the length of the single file row of said glass containers to be moved toward said lehr at one time;

a first angled flange attached to one edge of said main member along the length thereof and inclined toward the centerline of said main member;

a second angled flange attached to the opposite edge of said main member from said first angled flange and inclined toward the centerline of said main member on the same side thereof as said first angled flange;

a plurality of liner bars in engagement with said first and second angled flanges, each of said liner bars having a front face extending beyond said angled flanges toward said glass containers, said liner bars' front faces each being equal in length to slightly more than one diameter of said glass containers;

a plurality of spacers in engagement with said first and second angled flanges, said spacers and said liner bars being arranged in a repeating alternating pattern, said spacers extending further toward said glass containers than said front face to thereby define pockets for said glass containers between adjacent spacers separated by liner bars, the center to center spacing of adjacent spacers being slightly more than one glass container diameter; and means for locking said liner bars and spacers into said flanges.

2. The improvement of claim 1 wherein each of said liner bars is of the shape of a trapezoidal prism with the angled faces thereof in engagement with said first and second angled flanges.

3. The improvement of claim 1 wherein each of said liner bars is made of substantially pure carbon.

4. The improvement of claim 1 wherein each of said spacers is made of substantially pure carbon.

5. The improvement of claim 3 wherein the thermal conductivity of said liner bars is from about 1 to about 5 within a temperature range of from about 500° F. to about 1200° F.

6. The improvement of claim 4 wherein the thermal conductivity of said spacers is from about 1 to about 5 within a temperature range of from about 500° F. to about 1200° F.

* * * * *